United States Patent [19]

Wood

[11] Patent Number: 4,735,381

[45] Date of Patent: Apr. 5, 1988

[54] MULTI-BODY AIRCRAFT WITH AN ALL-MOVABLE CENTER FUSELAGE ACTIVELY CONTROLLING FUSELAGE PRESSURE DRAG

[75] Inventor: Richard M. Wood, Virginia Beach, Va.

[73] Assignee: The United States of America as represented by the Administrator of the National Aeronautics and Space Administration, Washington, D.C.

[21] Appl. No.: 13,801

[22] Filed: Feb. 12, 1987

[51] Int. Cl.⁴ .............................................. B64C 1/30
[52] U.S. Cl. .................................. 244/130; 244/119; 244/120; 244/15
[58] Field of Search ............... 244/119, 120, 130, 1 R, 244/1 N, 15; D12/335, 336

[56] References Cited

U.S. PATENT DOCUMENTS

| D. 199,105 | 9/1964 | Sleeman et al. | D12/335 |
|---|---|---|---|
| 2,874,922 | 2/1959 | Whitcomb . | |
| 2,898,059 | 8/1959 | Whitcomb . | |
| 2,995,320 | 8/1961 | Gottschalk | 244/15 |
| 3,114,525 | 12/1963 | Morgan et al. . | |
| 3,171,620 | 3/1965 | Walley et al. . | |
| 3,261,575 | 7/1966 | Lock et al. . | |
| 3,334,845 | 8/1967 | Ricard . | |
| 3,433,439 | 3/1969 | Brame et al. . | |
| 4,256,276 | 3/1981 | Cinivera et al. | 244/130 |
| 4,417,708 | 11/1983 | Negri . | |
| 4,582,276 | 4/1986 | Gerhardt | 244/119 |

FOREIGN PATENT DOCUMENTS 932410  9/1955  Fed. Rep. of Germany ...... 244/130

OTHER PUBLICATIONS

Anderton, "NACA Formula Eases Supersonic Flight" Aviation Week, Sep. 12, 1955, pp. 12-15.

Primary Examiner—Galen Barefoot
Attorney, Agent, or Firm—George F. Helfrich; John R. Manning

[57] ABSTRACT

A multi-body aircraft with an all-movable center fuselage 20 which translates relative to two side fuselages 22. At subsonic and transonic flight the center fuselage 20 is in a forward position. At supersonic speeds the center fuselage 20 moves aft so as to ensure optimum aerodynamic interference at particular Mach numbers. This provides an increased shock strength and greater surface area so that significant reductions in zero-lift wave drag can be achieved. This concept allows for a significant increase in the wing aspect ratio which would improve high-lift performance at all speed without incurring a significant supersonic zero-lift wave drag penalty. In addition, an improved low-fineness ratio, high-speed performance is achieved at all speeds and for all flight conditions.

8 Claims, 2 Drawing Sheets

MULTI-BODY AIRCRAFT WITH AN ALL-MOVABLE CENTER FUSELAGE ACTIVELY CONTROLLING FUSELAGE PRESSURE DRAG

ORIGIN OF THE INVENTION

The invention described herein was made by an employee of the United States Government and may be manufactured and used by/or for the Government for governmental purposes without the payment of any royalties thereon or therefor.

BACKGROUND OF THE INVENTION

1. Field of the Invention

The present invention relates to an aircraft having a multi-body configuration in which the fuselage volume is redistributed off a configuration center line so as to improve the aerodynamic performance of low-fineness ratio, high-performance aircraft at all speeds and flight conditions. A multi-body fuselage design is employed such that the center fuselage is moved fore and aft relative to side fuselages in accordance with the speed of the aircraft.

2. Description of the Related Art

Prior art applications of multi-body design concepts are limited to the general concepts of movable wing components or nose components. Variable sweep wing designs have structural problems due to large movements required and large aerodynamic loads carried by the wing. Variable sweep wing aircraft include aircraft in which the wing rotates fore and aft on a pivot, the sweep of the wing being the angle at which the wing is swept back. Aircraft of this type include the F-111 and the F-14 fighter aircraft.

Previous studies and designs have only addressed the redistribution of volume in configuring an aircraft, and have not taken into consideration the shaping of the longitudinal body cross-section as well as the lateral distribution of volume. That is, the prior art has only considered the redistribution of the fuselage volume and not the lateral and longitudinal position of the fuselage volume. The fuselage pressure drag, which is the force due to pressure on the body, that acts in the direction of the longitudinal body axis, remains a problem.

Aerodynamic vehicles are categorized according to a fineness ratio which is the volume (v) of the vehicle divided by the wing area (S) to the three-halves power, and is represented as:

$$\frac{v}{(S)^{3/2}}$$

This equation represents the total geometric characteristics of an aerodynamic vehicle in one geometric equation. The present invention is directed to aircraft which have a fineness ratio in a range of 0.7 to 1.0.

SUMMARY OF THE INVENTION

An object of the present invention is to provide a multi-body aircraft having a movable center fuselage for active control of fuselage pressure drag.

A further object of the present invention is to improve the aerodynamic performance of low-fineness ratio, high-performance aircraft at all speeds and flight conditions.

An additional object of the present invention is to significantly reduce zero-lift wave drag in high performance aircraft.

Another object of the present invention is to provide an aircraft having three highly-tailored fuselage formed bodies such that the three fuselages are orientated to provide maximum aerodynamic interference at a particular Mach number (M).

A further object of the present invention is to provide a simple aerodynamic and structural aircraft design which requires a maximum translation of the center fuselage of only 5% of a total configuration length of the aircraft and which allows for the decoupling of zero-lift wave drag (the force along the longitudinal body axis of an aerodynamic vehicle due to pressure on the body when there is no lift on the aircraft) and drag-due-to-lift considerations during a design process.

The above-mentioned objects are attained by providing a multi-body aircraft having a center fuselage translating fore and aft relative to at least two side fuselages, located on either side of the translating center fuselage, in accordance with the speed of the aircraft. The translating center fuselage is in a forward position at subsonic and transonic flight, and translates aft relative to the two side fuselages at supersonic speeds. A mechanism for moving the center fuselage relative to the two side fuselages is provided.

Although the application of the present invention is referenced with respect to fighter aircraft and significant improvements in their aerodynamic performance, this invention may be applied to other types of aircraft.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENT

Figure 1:
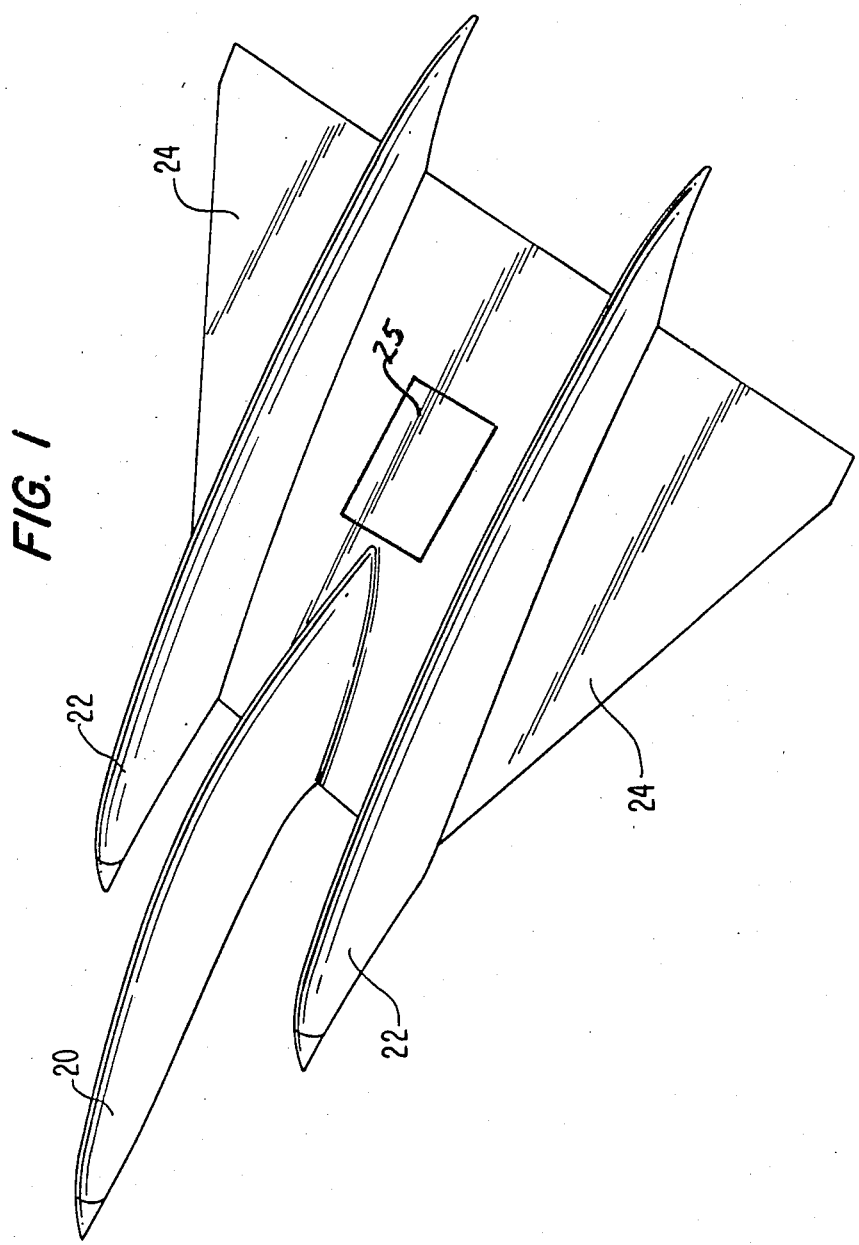
FIG. 1 is a perspective view of an example of a tribody aircraft according to the present invention.

FIG. 1 is an example of a multi-body aircraft according to the present invention which includes a tribody design. Generally, the tribody design includes a center fuselage 20 located between two side bodies, each side body including a side fuselage 22 and wing 24. A detailed tribody design is determined by PAN AIR code (see Moran, Jack et al., *User's Manual—Subsonic/Supersonic Advanced Panel Pilot Code*, NASA CR-152047, 1978) or other related computer codes. The supersonic area rule methodology is employed to achieve the proper distribution of configuration volume and is a general rule of design directed to the distribution of volume of an aerodynamic vehicle in order to minimize the zero-lift wave drag, i.e., to improve performance of the vehicle (see for example, Craidon, Charlotte B., *User's Guide for a Computer Program for Calculating the*

*Zero-Lift Wave Drag of Complex Aircraft Configurations,* NASA TM-85670, 1983). This rule includes a series of equations that are employed in a technique for obtaining a working geometry for distributing the volume of the vehicle. The invention takes into consideration not only the distribution of volume, but also the lateral and longitudinal distribution of fuselage volume which is dictated by both the design Mach number (the Mach number around which the aircraft is designed to fly most efficiently and for the majority amount of the time it is in the air) and the wing planform.

The structure of the aircraft and pilot orientations, however, limit the lateral and longitudinal distribution of the fuselage volume, but must be considered in the design process. Structural considerations prohibit large lateral separations (see y in FIG. 3) and pilot considerations require that a center fuselage must be employed in order to minimize the g loads and to maximize visibility. Therefore, the three fuselage design of the present invention, including a movable center fuselage, was developed.

The translating center fuselage of the present invention provides large improvements in drag reduction at off design conditions (off design conditions being conditions which deviate from the Mach design conditions).

The three fuselage design of the invention employs a design point of $M=1.80$, where M is the Mach number. The concept of the invention can be employed for Mach numbers between $M=1.5$ to $M=3.0$ for optimum results. Aircraft designed around Mach numbers below $M=1.5$ and above $M=3.0$ would not receive the advantages of the invention since above $M=3.0$ and below $M=1.5$ the physics governing aerodynamics differs from that between $M=1.5$ to $M=3.0$.

Figure 2:
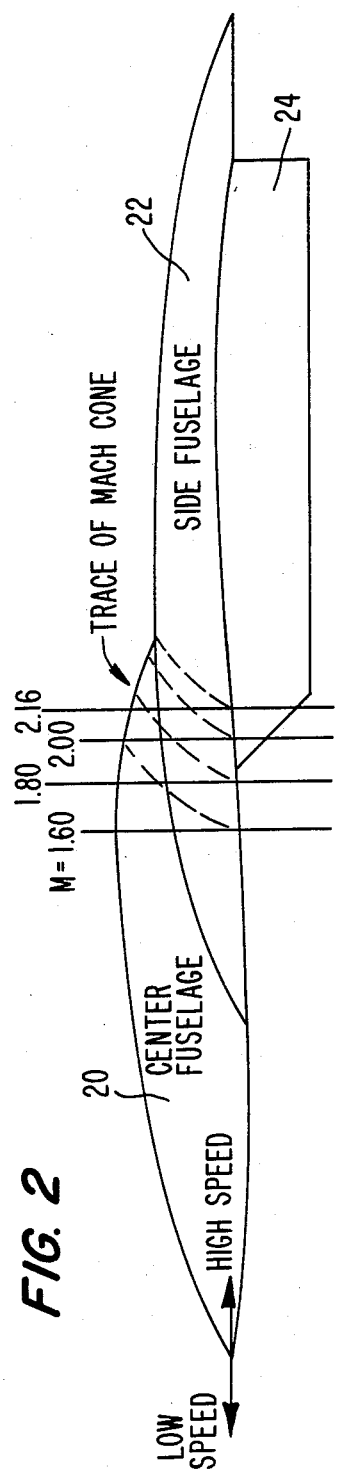
FIG. 2 is a side view of the aircraft of FIG. 1 illustrating center fuselage 20, side fuselage 22, and wing 24, and showing the expected disturbance patterns at various Mach numbers.
Figure 3:
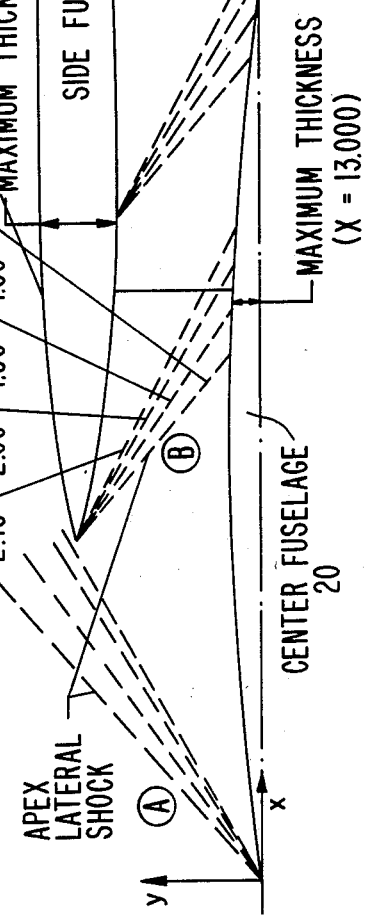
FIG. 3 is a partial planform view of the aircraft of FIG. 1 showing Mach disturbances on the center fuselage 20 and side fuselage 22 at various Mach numbers.

FIG. 2 shows a trace of a Mach cone at various speeds (Machs) at which the aircraft flies. At subsonic and transonic flight the center fuselage 20 is in a forward position. At supersonic speeds, the center fuselage 20 moves aft to ensure optimum levels of body-on-body interference. At supersonic Mach numbers, the center fuselage nose shock, labelled as A in FIG. 3, is allowed to impinge upon the side fuselage 22. A small increase in drag may result from this condition, but this is more than compensated for by the improved near field interaction of the side-body nose shock, labeled as B in FIG. 3, on the aft portion of the center fuselage. That is, the invention provides increased shock strength and greater surface area on which the favorable pressure field may act for the configuration. The surface pressure coefficient at various Mach numbers and the nose cone angle corresponding thereto for the side fuselage 22 and center fuselage 20 are shown below in Table 1.

TABLE 1

| Component | Nose Cone angle, $\tan^{-1}\left(\frac{y}{x}\right)$, deg | Surface pressure coefficient at a Mach number of - | | | |
|---|---|---|---|---|---|
| | | 1.60 | 1.80 | 2.00 | 2.16 |
| Side fuselage | 14.4° A | 0.200 | 0.190 | 0.180 | 0.170 |
| Center fuselage | 7.5° B | .075 | .074 | .72 | .071 |

As set forth above, the three fuselage design of the present invention, as shown in FIGS. 1-3, includes a center fuselage 20 and two side fuselages 22. Therefore, the three fuselage design is symmetric about the longitudinal center line of the center fuselage 20. The center fuselage 20 is moved fore or aft relative to the side fuselage 22 depending on the speed at which the aircraft is flying. The mechanization for moving the center fuselage 20 in a direction fore or aft can be accomplished by employing various translating devices 25 since actuation speed is not an important factor or dominate characteristic of the invention. An example of a translating device 25 for moving the center fuselage would include a hydraulic actuator system, which is a common system employed on most aircraft, in which the center fuselage resides on a track and traverses fore and aft along the track. A more preferable system might include a hydraulic piston type arrangement.

The movement of the center fuselage 20 for each transition phase of the aircraft, i.e., from take-off to supersonic speeds, takes approximately 100 seconds. Thus, it takes approximately 100 seconds for the center fuselage 20 to move through the various transition phases from take-off to supersonic speeds. This is a slow response time compared to other systems (i.e., movable wing systems and other multibody configurations), but since the actuation speed is not a significant factor of the invention, the response time has no effect on the advantages of the invention. The center fuselage 20 can therefore be moved by various mechanisms depending on the type of aircraft or efficiency of the system required, and is not restricted to any particular system, as set forth above.

The design condition of $M=1.80$ of the invention has been verified and the theoretical predictions (such as PAN-AIR) have been evaluated. The theoretical predictions for the off design conditions have verified the performance improvements of maximum aerodynamic interference at various Mach numbers by actively controlling the pressure drag on the body of the aircraft. Structural penalties for a translating center fuselage 20 as that disclosed hereinabove are small compared to variable sweep wing aircraft, due to the small movements and small aerodynamic loads on the body of the aircraft as compared to a wing structure. The design of the invention is also simple to implement both aerodynamically and structurally because of the low aerodynamic loads on the center fuselage 20. The design only requires a maximum translation of the center fuselage 20 of 5% of the total configuration length of the aircraft.

Additional features of the invention with respect to aerodynamic performance include a reduced wing bending moment due to a span loader effect resulting in a lower weight of the aircraft, and a reduced structural length making it easier to achieve a target aerodynamic fineness ratio. The invention has excellent applications with respect to shipboard applications of fighter aircraft. The wing aspect ratio of the aircraft can be increased significantly to improve the high lift performance of the aircraft without a significant supersonic drag penalty. Thus, the all-moving center fuselage 20 of the invention is especially applicable to low-fineness ratio, high-speed fighter aircraft, since it provides active control of fuselage pressure drag. In addition, the body shaping techniques employed improve the near-field body-on-body interference effects, and thus increase drag reduction.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

What is claimed is:

1. A multi-fuselage aircraft, comprising:
    at least two side fuselages;
    a center fuselage translating fore at subsonic and transonic speeds and aft at supersonic speeds relative to said at least two side fuselages; and
    means for translating said center fuselage fore and aft in dependence upon the speed of said aircraft.

2. A multi-fuselage aircraft as set forth in claim 1, wherein said means for translating said center fuselage comprises a hydraulic actuator system.

3. A multi-fuselage aircraft as set forth in claim 1, having a range of Mach design conditions between $M=1.5$ and $M=3.0$ (M being the Mach number).

4. A multi-fuselage aircraft as set forth in claim 3, wherein said Mach design condition is $M=1.8$.

5. A multi-fuselage aircraft as set forth in claim 4, wherein a maximum translation of said center fuselage is 5% of a total configuration length of said aircraft.

6. An aircraft as set forth in claim 2, wherein the maximum translation of said center fuselage is 5% of a total configuration length of said aircraft.

7. An aircraft as set forth in claim 6, wherein said means for translating comprises a hydraulic actuator system.

8. An aircraft as set forth in claim 6, wherein said means for translating comprises a hydraulic piston arrangement.

* * * * *